Figure 1:
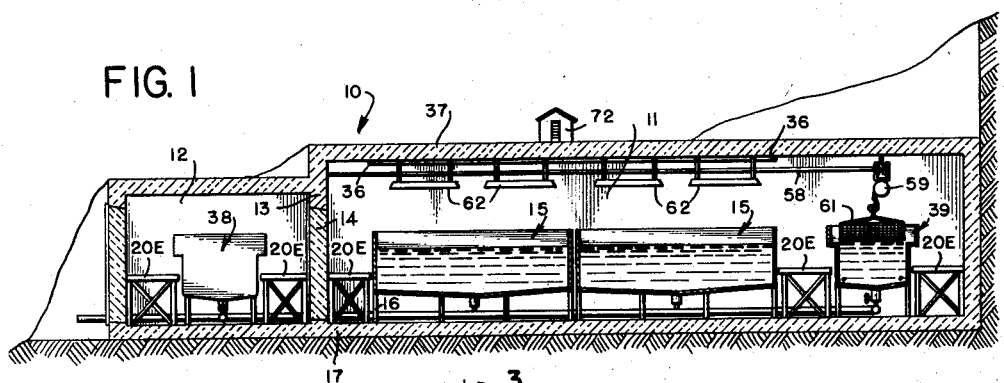

July 12, 1960   D. O. KEELY   2,944,513
APPARATUS FOR FISH CULTURE
Filed June 20, 1957   2 Sheets-Sheet 1

INVENTOR
D. O. KEELY
BY
ATTORNEYS

July 12, 1960 D. O. KEELY 2,944,513
APPARATUS FOR FISH CULTURE
Filed June 20, 1957 2 Sheets-Sheet 2

INVENTOR
D. O. KEELY
BY *Hyatt Dowell*,
ATTORNEYS

United States Patent Office 2,944,513
Patented July 12, 1960

2,944,513

APPARATUS FOR FISH CULTURE

Donald O. Keely, P.O. Box 357, Knox, Pa.

Filed June 20, 1957, Ser. No. 666,978

5 Claims. (Cl. 119—3)

This invention relates to the care, culture and protection of wild life including fish and more particularly to the method and equipment for rearing fish and improving and accelerating their growth to maturity in a minimum of time and in limited space and with limited supply of water.

Heretofore, fish have been produced in various hatcheries by conventional hatching methods in a fish hatchery and then were reared in a rearing station which may be run in connection with the same hatchery.

The conventional manner of rearing the fish has been to place them in runways of substantial length with partitions between portions of the runways for controlling the various sizes of fish. Such runways are a hundred or more feet long and approximately six feet wide and six feet deep, require large open spaces and have therefore been located out of doors. One or more stand-up aerating pipes are provided in each partitioned portion of a runway for spraying water upwardly like a fountain thereby aerating such water to supply oxygen for the needs of the fish. Each succeeding runway is normally located at a lower elevation with the bulkheads extending between the runways serving as dams over which the water falls for aeration purposes. Water is supplied continuously to the runways flowing from each runway to the succeeding runways.

The fingerlings received from a hatchery are placed in the first or highest runway where they receive the freshest and coldest water and as they increase in size they are transferred to lower runways. A screen is located above each bulkhead or dam and such screen collects leaves, algae and the like, interfering with the continuous flow of water with resulting maintenance problems.

Also, diseases have been transmitted from the higher runways to the succeeding runways and consequently the maintenance of healthy fish has been extremely difficult. Further, the runways have been out in open fields where they are exposed to direct sunlight and to other conditions of weather with the only means for controlling the water temperature being the continuous flow of water from the main supply. As a result, the prior arrangement of runways and present equipment has not provided optimum conditions for maximum production of commercial size fish. Further, it has required large numbers of employees to feed and care for the fish and the hand methods required involved much labor. Also, it was extremely difficult to keep the runways clean and sanitary because of possible contamination from insects, birds and the like.

An object of the present invention is to overcome the problems and difficulties of the prior art and to provide a method and apparatus for the culture of marine life and more particularly fish.

Another object of the invention is to provide accurate control for the environment of fish from the hatching of the eggs to the adult fish.

A further object is to provide equipment and a method by means of which maximum growth of fish can be obtained and a minimum growth of objectionable bacteria.

A further object is to provide a system of hatching and rearing fish with a minimum supply of water making it practical to rear fish close to the demand.

A further object is to provide a method and apparatus for obtaining maximum growth of fish during the entire year unaffected by climatic conditions.

A further object is to provide equipment which is adaptable for accurate research on the growth and development of fish to obtain precise data on the ideal habitat including the chemical composition of the water, the aeration and the temperature.

A still further object is to provide a controlled environment for fish or other marine life to adapt such life to a natural environment into which it will be introduced.

Figure 2:
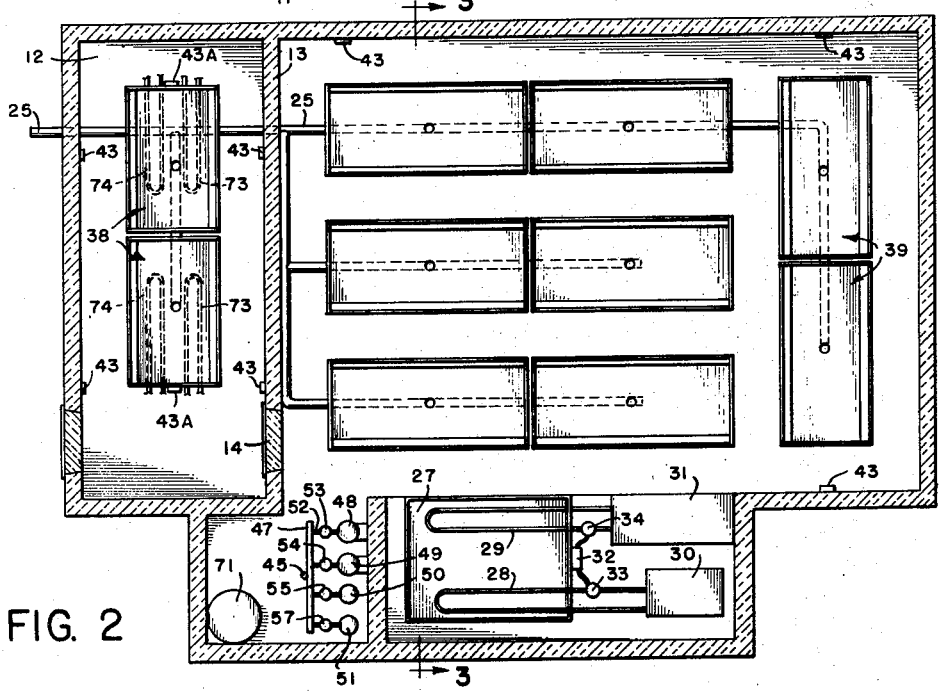
Figure 3:
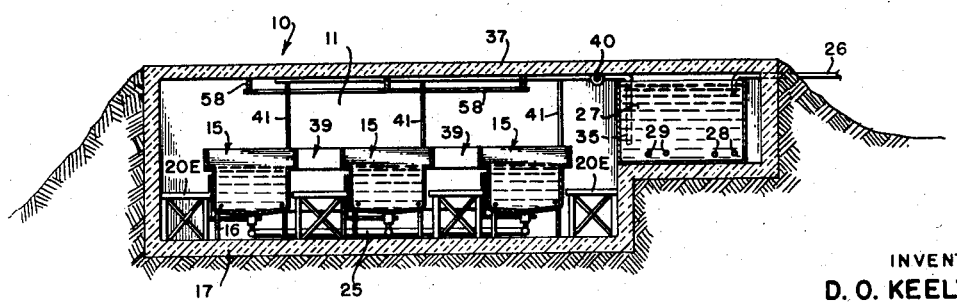
Figure 4:
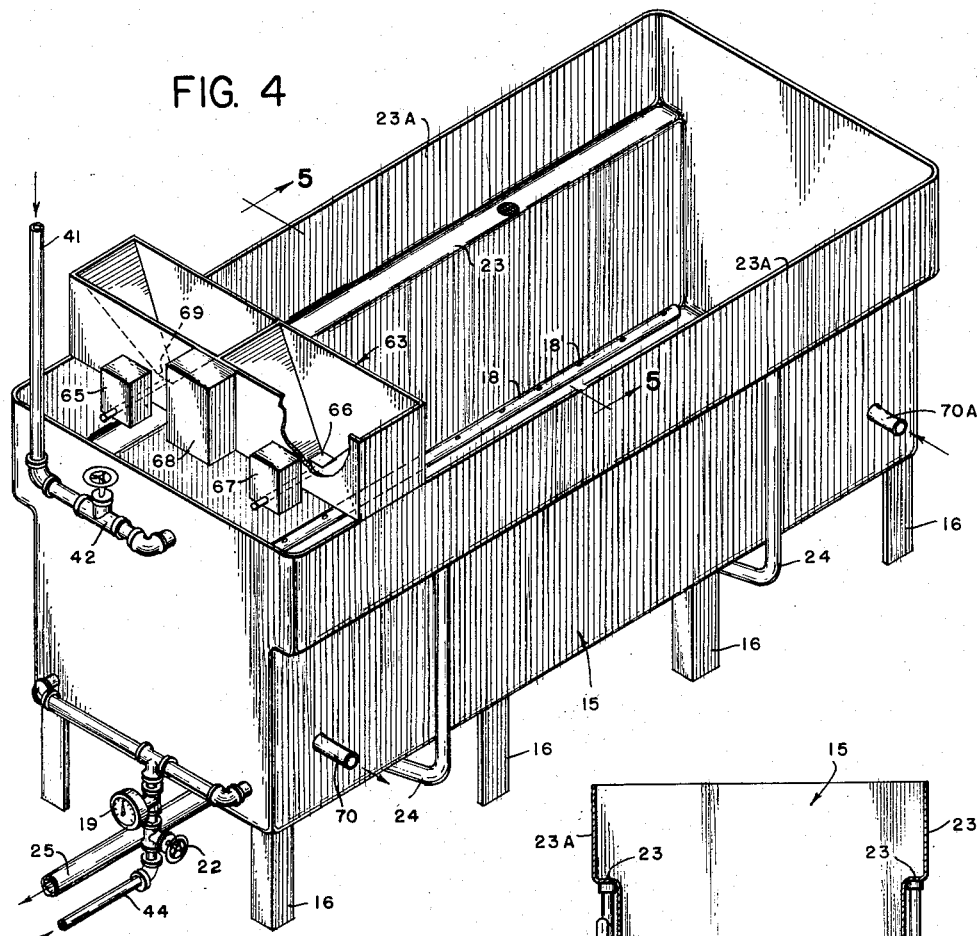
Figure 5:
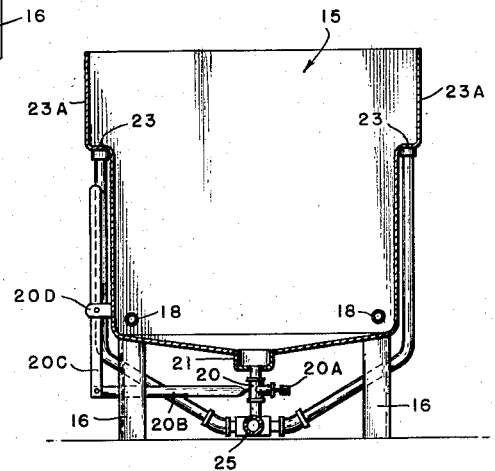
Figure 6:
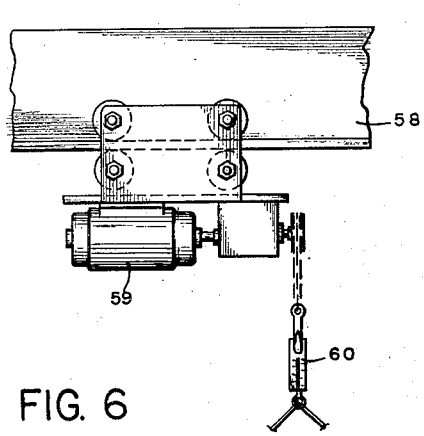

Other and further objects will be apparent as the description proceeds and upon reference to the accompanying drawings wherein:

Fig. 1 is a vertical section of a building located in a hillside and equipped with apparatus of the present invention for propagating and rearing fish;

Fig. 2, a horizontal section through the building showing the arrangement of rearing tanks, air conditioning equipment, air supply, filters and tempering tanks;

Fig. 3, a transverse vertical section taken substantially on line 3—3 of Fig. 2 showing the storage reservoir tank and rearing tanks in section;

Fig. 4, an enlarged perspective view of one of the tanks suitable for rearing fish;

Fig. 5, a transverse section taken substantially on line 5—5 of Fig. 4 showing one of the tanks with its overflow and drain control; and Fig. 6, an enlarged detail of the travelling crane for raising baskets of fish out of the tanks for weighing.

Referring more particularly to the drawings, a building 10 is formed with walls of insulating material to reduce heat losses through the walls thereof, such building preferably being located in the side of a hill which is excavated to accommodate the building with a substantial amount of the earth around the sides of the building to additionally provide insulation and to maintain the building at a desired temperature. The building includes a rearing room 11 and a tempering room 12 separated by a partition 13 having a doorway 14 to provide access between the rooms. Within the rearing rooms are a plurality of tanks, preferably made of high quality aluminum, approximately 20 feet long, 4 feet high and 6 feet wide. The tanks are supported on legs 16 from the floor 17. Aerating pipes 18, 18 extend into each tank adjacent the sides, said pipes having a number of perforations 18' along the upper side thereof for uniform aeration. Suitable fittings extend from the pipes 18 to a T connection and to a gage 19 and a control valve 22 to sources of air supply by suitable piping connections. Each tank 15 has the bottom wall thereof sloping from the edges toward a sump 21 in which the foreign material will accumulate, a valve 20A being provided for quick flushing the sump for removal of foreign matter, such valve discharging such foreign matter with the flushing water into a sewer 25 for discharge outside of the building thereby avoiding contamination.

Each rearing tank 15 is provided with a scum gutter 23 on two sides, each gutter having a screened discharge connected to a suitable drain pipe 24 for discharge to the sewer 25. Water is obtained from a suitable mountain spring or other suitable source and is delivered through a pipe 26 to one or more storage reservoirs 27 preferably located at a level above the tanks 15 to provide for gravity feed of the water to the tanks.

To obtain the desired water temperature in such storage reservoirs 27 heating coils 28 and/or cooling coils 29 are provided, such heating and cooling coils being operated with a suitable heat transfer medium from a furnace 30 or a refrigeration unit 31, the flow of cooling or heating medium being controlled by a thermostat 32 having suitable means for controlling valves 33 and 34 respectively of the heating and cooling coils whereby the temperature of the water in the storage tank may be raised or lowered for the desired temperature.

Suitable piping from the reservoir 27 to the rearing tanks includes an upstanding section 35 extending from the bottom of the reservoir to a horizontally extending header 36 located adjacent the roof 37 of the building, suitable branch lines being provided to tempering tanks 38 in the tempering room 12 and to the end tanks 39 whereby water can be conducted to each rearing tank, suitable pump 40 being provided to initiate the flow of water, the flow being maintained by the siphon action of downwardly extending pipe sections 41 which include valves 42 and outlet fittings to supply the various tank sections, the flow of water being controllable by proper adjustment of the valves.

The heating unit 30 and the cooling unit 31 are provided with suitable means to completely air condition the entire building including the rearing room 11 and tempering room 12, this being accomplished by any suitable means such as air ducts, radiators and/or the like (not shown) whereby the temperature of the building can be accurately maintained to maintain the temperature of the rearing tanks at the desired temperatures for the fish being reared. Suitable thermostatic control means 43 are provided at suitable locations within the rooms whereby the tempering room 12 may be kept at a different temperature from the rearing room 11, controlling the heating and cooling units and radiators and/or ducts in a well-known manner. To additionally maintain the rearing tanks and the tempering tanks at the desired temperature suitable individual heating and cooling coils may be provided for each tank or tank section although the room temperatures should be sufficient to obtain the desired constant operating temperature in the tanks. When individual heating and/or cooling coils are provided for each tank thermostatic control is provided therefor as shown at 43A for the tempering tanks. Compressed air is furnished to aerating pipes 18, 18 in the tanks, from air pipes 44 connected to header pipes 47.

An air supply pipe 45 extends from the pipes 44 to a header 47 which is connected to main compressor 48 and auxiliary compressor 49 respectively and also to bottles of oxygen 50 and 51. The compressor 48 being connected through a pipe 52 having a pressure responsive device 53 to the header, said pressure responsive device 53 serving to control a normally open manually resettable switch for operating the compressor 48 and adjusted to operate the switch to cause auxiliary compressor 49 to begin operation and supply compressed air through pipe 54 to the header 47 upon reduction of the pressure in header 47 to below a predetermined value such as 28 pounds per square inch. A valve 55 in a line 56 extending from oxygen bottle 50 to the header 47 controls the flow of oxygen from bottle 50 while a valve 57 in line 58 controls the flow of oxygen from bottle 51 to the header 47. In the event that pressure in header 47 falls below a predetermined lower value such as 24 pounds/square inch the pressure responsive valve device 55 opens the valve and the oxygen bottle 50 will supply oxygen to the header 47 and to the supply pipe 45 and to the aerating pipes 18, 18. In the event of failure of the supply of oxygen in bottle 50 the pressure responsive valve device 57 will open letting the oxygen from the bottle 51 pass into header 47 until it is exhausted.

Overhead track 58 is secured to the roof 37 of the building and carries a hoist or crane 59 over the tanks, the crane being provided with suitable hoisting mechanisms and carrying a weighing scale 60 thereon for weighing the fish. A screen basket 61 designed to fit the inside of the tank is placed in the bottom of the tank and the fish guided into the basket which is then raised with all the fish therein. The basket being supported from the scale gives an accurate measurement of the quantity of fish when the fish and the basket are raised out of the water.

The present system of raising fish includes hatching the eggs under desired conditions which can be controlled by the temperature of the water and the surrounding air. For example one of the tanks may be located in a separate room where the conditions can be controlled for rapidly hatching the eggs under the desired conditions of temperature, light and composition of the water thereby producing fingerlings in less time and earlier in the year.

In rearing fish with the equipment described, the fish eggs may be hatched in the usual manner or in the manner above described and on reaching fingerling size are placed in one of the rearing tanks 15 with air being constantly supplied and also with or without water being constantly supplied to provide for some overflow into the scum gutters 23 for discharge of scum material from the tanks.

Much of the foreign matter collects in the sump 21 and can be removed by opening quick opening valve 20. The valve 20 is preferably of the quick-acting gate type in which the stem 20A is provided with a lateral extension to which a link 20B is connected, such link being pivotally connected to a lever 20C pivotally mounted on a lug 20D supported on the tank 15 whereby the quick acting valve can be rapidly operated by a person standing on the adjacent platform 20E to manipulate the operating end of the lever 20C while the attendant observes the fish from above.

Lights 62 are provided throughout the entire building and serve to increase the activity of the fish thereby increasing their rate of growth, the lights further serving as an additional element of control.

Food is introduced into the tanks 15 by any suitable means but preferably by automatic means such as a hopper 63 supported on the top of the tank and having a section adjacent the water inlet for dropping the food onto the water. The control for such feeding means may include one or more valves 69 of any suitable type which may be controlled by one or more solenoids 65 which may be operated by a timing mechanism such as a clock or the like. A similar hopper may be provided for adding chemicals such as lime, salt or the like and may be provided with a valve 66 operated by a solenoid 67.

Also a control may be provided for adding limited and controlled quantities of chlorine to the tank by some suitable type of chlorinator 68.

The tanks have smooth interiors and can be brushed and scrubbed so that the fingerlings or fish will remain in a desired environment. The temperature of the water is originally obtained from the constant temperature supply reservoirs 27 and the temperature of the tanks are maintained constant by the air in the building and in the event that some further modification is required heat or cold may be supplied directly to the tanks needing adjustment.

Periodically a net or basket is placed in the tank and the fish in the tank are raised out of the water and weighed in a minimum of time and upon obtaining the information as to the weight of such fish the attendants can calculate the precise amount of food necessary for the fish in that particular tank. Further, the temperature of the water in the tank is also important in determining the amount of food and since this temperature remains substantially constant a principal factor which needs consideration is the weight of the fish.

As the fish increase in size they may be kept in the same tank or the group of fish may be divided into 2 or more tanks to provide sufficient room for their growth.

It has been possible to raise fish in the proportion of up to 7 pounds of fish per cubic foot of water. Consequently with the periodic weighing of the fish in a tank the attendants will know whether a tank is over crowded and if over crowding occurs the fish may be separated into several tanks.

The present invention also contemplates the storage of fish without appreciable growth when the demand for commercial size fish is low. With the present equipment the temperature of the water and the temperature of the air in the building may be lowered to such a degree as to substantially stop the metabolic processes of the fish whereby the fish need very little food and very little air and consequently it is possible to store a large quantity of living fish at minimum cost without adversely affecting the health of the fish. When the demand for fish is low the temperature of the tanks can be lowered reducing food costs and when the demand is high the metabolic process can be increased by the individual heating of selected tanks or by increasing the temperature of the entire building and thereby increasing the temperature of all of the tanks.

With raising fish with the equipment according to the present invention the desired temperature for the production of fish can be obtained for maximum production with minimum growth of bacteria and it is believed that 52° F. is the desired temperature for brook, brown and rainbow trout and the present equipment and method is particularly designed for the rearing of such fish, the equipment also being adaptable for any species of marine life.

With the present invention, relatively small quantity of water is required and suitable chemicals can be added to provide the proper composition to the water for maximum production of fish. The water will be tested at periodic intervals to maintain the desired composition for the particular species of fish with suitable adjustments being made as required, care being taken to avoid sudden changes.

It is also contemplated to provide means to automatically dispense feed and/or chemicals to the tanks whereby the desired composition can be maintained with a minimum of variations.

With the present invention it is possible to maintain desired conditions preventing contamination of the tanks and the fish from outside sources since the low temperature of the building deters insects from entering and deters the formation of harmful bacteria and also avoids danger of contamination from birds, animals and the like.

Further, with present invention there is no danger of pollution or contamination of feed which may be dropped since such feed will not appreciably attract insects such as flies in the cool environment of the building and the spilled food can also be cleaned up effectively.

By using the present invention fish can be artificially acclimated to their future environment by adding chemicals of the proper kind and amount and tempering the water preferably in tanks 38 to the new environment whereby the shock to the fish is materially reduced or prevented and consequently the stocking of fish to their new habitat can be accomplished with practically no loss.

As previously described the fish will be raised to maturity in the rearing tanks in accordance with the commercial demands, the capacity of the rearing station and the desired environmental conditions with the result of producing commercially acceptable healthy fish for stocking natural waters as well as artificial fishing ponds.

With the present invention the fish can be produced for commercial sale directly to the consumer and sold directly through marketing channels, thereby avoiding the uncertainties involved with commercial fishing on natural bodies of water.

The present invention is particularly suitable for rapidly propagating a number of generations of fish since the present equipment and method contemplates maintaining environmental conditions of temperature, chemical composition of matter in the water and control of the food to produce the maximum rate of reproduction whereby desirable traits in fish or other marine life can be accelerated.

With the present equipment and method, it will be possible to select the more desirable fish to obtain the desired characteristics, such as rapid growth, taste and the like.

The present method and apparatus provide a system of raising fish with a small supply of water making it possible to produce such fish near the demand, thereby avoiding the great expense of transporting live fish. Further, it will be possible to more accurately temper the fish to the conditions of their new environment in the tempering room of the present invention since the temperature, chemical compositions and the like can be effectively controlled.

The water in the tanks may be changed as required by use of the inlet valve 42 and the quick acting valve 20 and the water in any tank may be filtered to additionally remove solid material therefrom. For this purpose an inlet fitting 70 may be provided adjacent one end of the tank and an outlet fitting 70A adjacent the other end of the tank. A diatomaceous earth filter 71 is provided for selective connection to a particular tank having water to be cleaned by the filtering process. Suitable piping and valves may be provided between the tanks and the filter for this purpose. The filter can be cleaned and back-flushed as required to obtain desirable conditions of cleanliness and suitable disinfectants may be used during such cleaning of the filter, the waste products including the back washing water being discharged through the sewer 25.

Heating and cooling coils 73, 74 respectively are shown on the tempering tanks 38 and may be provided in each of the tanks if desired, suitable heat transfer medium being used to conduct the heat or cold from the furnace 30 or refrigeration unit 31 respectively.

It will be evident that the controlling of the temperature of the air in the building will reduce or substantially prevent condensation of moisture on the tanks and it is proposed to supply air to the compressors from the outdoors through suitable washing and filtering means to obtain clean air for the fish, a suitable ventilator 72 being provided to permit the air to escape from the building. Heat transfer means may be provided for preheating or precooling the fresh air from the exhaust air to reduce the cost of air conditioning.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for hatching and rearing fish comprising a building structure a major portion of which is under ground, said building structure containing a supply tank having associated therewith a conduit adapted to be connected to a source of water, water tempering means including heating and cooling means operatively associated with said supply tank, an open top fish tank, conduit means interconnecting said supply tank and said fish tank, aerating and conditioning means operatively connected to a lower portion of said fish tank and a waste discharge conduit operatively connected to said fish tank.

2. The invention according to claim 1 in which a plurality of fish tanks are located within the building and means are provided for supplying water from said supply tank to said plurality of fish tanks.

3. The invention according to claim 1 in which means are provided for weighing the fish in the fish tank.

4. The invention according to claim 1 in which lights are provided to supply illumination and light radiation to the fish tanks to encourage growth of fish.

5. The invention according to claim 1 in which an auxiliary supply of oxygen is connected to said aerating means and is rendered operative to supply oxygen to the fish tank when the aerating means becomes inoperative.

References Cited in the file of this patent

UNITED STATES PATENTS

| | | |
|---|---|---|
| 1,248,169 | Schnoor | Nov. 27, 1917 |
| 2,302,336 | MacDonald | Nov. 17, 1942 |